(12) United States Patent
Karg et al.

(10) Patent No.: US 11,157,792 B2
(45) Date of Patent: Oct. 26, 2021

(54) MULTI-LAYER OSCILLATING NETWORK

(71) Applicant: International Business Machines Corporation, Armonk, NY (US)

(72) Inventors: Siegfried F. Karg, Adliswil (CH); Fabian Menges, Urdorf (CH); Bernd Gotsmann, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 15/790,679

(22) Filed: Oct. 23, 2017

(65) Prior Publication Data

US 2019/0122095 A1    Apr. 25, 2019

(51) Int. Cl.
| | |
|---|---|
| *G06N 3/04* | (2006.01) |
| *G06N 3/08* | (2006.01) |
| *G06N 3/063* | (2006.01) |
| *G06K 9/46* | (2006.01) |
| *G06K 9/62* | (2006.01) |
| *G06K 9/00* | (2006.01) |

(52) U.S. Cl.
CPC ........... *G06N 3/04* (2013.01); *G06K 9/00986* (2013.01); *G06K 9/4628* (2013.01); *G06K 9/6274* (2013.01); *G06N 3/049* (2013.01); *G06N 3/063* (2013.01); *G06N 3/08* (2013.01); *G06K 9/6257* (2013.01)

(58) Field of Classification Search
CPC .... G06K 9/00986; G06N 3/049; G06N 3/063; G06N 3/04
See application file for complete search history.

(56) References Cited

U.S. PATENT DOCUMENTS

| | | | | |
|---|---|---|---|---|
| 5,671,336 A | * | 9/1997 | Yoshida | G06N 3/0635 706/30 |
| 6,999,953 B2 | * | 2/2006 | Ovhsinsky | G06N 3/0635 706/39 |
| 7,280,989 B1 | * | 10/2007 | Hoppensteadt | G06N 3/049 706/30 |

(Continued)

FOREIGN PATENT DOCUMENTS

EP    2742467 B1    7/2016

OTHER PUBLICATIONS

Chen et al., "Compact oscillation neuron exploiting metal-insulator-transition for neuromorphic computing," in Proceedings of the 35th International Conference on Computer-Aided Design. ACM, Nov. 10, 2016, p. 15. (Year: 2016).*

(Continued)

*Primary Examiner* — Paulinho E Smith
(74) *Attorney, Agent, or Firm* — Robert J. Shatto

(57) ABSTRACT

A computing network comprising a first layer comprising a first set of oscillators and a second layer comprising a second set of oscillators is provided. The computing network further comprises a plurality of adjustable coupling elements between the oscillators of the first set and a plurality of nonlinear elements. The nonlinear elements are configured to couple output signals of the first layer to the second layer. The computing network further comprises an encoding unit configured to receive input signals, convert the input signals into phase-encoded output signals, and provide the phase-encoded output signals to the first layer.

18 Claims, 8 Drawing Sheets

(56) References Cited

U.S. PATENT DOCUMENTS

| | | | | |
|---|---|---|---|---|
| 7,783,584 | B1* | 8/2010 | Hoppensteadt | G06N 3/049 706/15 |
| 8,930,292 | B2* | 1/2015 | Large | G10L 25/30 706/25 |
| 2003/0169776 | A1* | 9/2003 | Reesor | H04J 3/0632 370/503 |
| 2009/0287624 | A1 | 11/2009 | Rouat et al. | |
| 2010/0228393 | A1* | 9/2010 | Mersmann | G06N 3/04 700/246 |
| 2011/0202489 | A1* | 8/2011 | Large | G06N 3/049 706/25 |
| 2015/0131607 | A1* | 5/2015 | Koorapaty | H04L 5/0007 370/330 |
| 2016/0125288 | A1* | 5/2016 | Pileggi | G06N 3/0635 706/29 |
| 2017/0039472 | A1* | 2/2017 | Kudo | G06N 3/063 |
| 2018/0005107 | A1* | 1/2018 | Neil | G06F 15/82 |
| 2018/0005676 | A1* | 1/2018 | Neil | G06N 3/084 |
| 2018/0226453 | A1* | 8/2018 | Yi | G11C 13/0007 |
| 2019/0108435 | A1* | 4/2019 | Mehnert | G06K 9/00805 |
| 2019/0122095 | A1* | 4/2019 | Karg | G06N 3/063 |
| 2020/0266879 | A1* | 8/2020 | Chia | H04B 7/15535 |

OTHER PUBLICATIONS

Jackson et al., "Implementing delay insensitive oscillatory neural networks using cmos and emerging technology," Analog Integrated Circuits and Signal Processing, vol. 89, No. 3, pp. 619-629, 2016. (Year: 2016).*

Jackson et al., "Oscillatory neural networks based on tmo nano-oscillators and multi-level rram cells," IEEE journal on Emerging and Selected Topics in Circuits and Systems, vol. 5, No. 2, pp. 230-241, 2015. (Year: 2015).*

Jackson et al., "An rram-based oscillatory neural network," in Circuits & Systems (LASCAS), 2015 IEEE 6th Latin American Symposium on. IEEE, 2015, p. 1-4. (Year: 2015).*

Kazantsev et al., "Forced Phase-Locked States and Information Retrieval in a two layer network of oscillatory neurons with directional connectivity", 2007, Physical Review, pp. 1-8 (Year: 2007).*

Stiefel et al., "Neurons as Oscillators", 2016, Journal of Neurophysiol, vol. 116, pp. 2950-2960. (Year: 2016).*

Schuman et al., "A Survey of Neuromorphic Computing and Neural Networks in Hardware", May 19, 2017, IEEE, pp. 1-88 (Year: 2017).*

Simonvo et al., "Pattern Retrieval in Three-Layer Oscillatory Network with a Context Dependent Synaptic Connectivity", 2012, Neural Networks, vol. 33, pp. 67-75. (Year: 2012).*

Yogendra et al., "Coupled Spin Torque Nano Oscillators for Low Power Neural Computation", Oct. 2015, IEEE Transactions on Magnetics, vol. 51 No. 10, pp. 1-9 (Year: 2015).*

Burr et al., "Experimental demonstration and tolerancing of a large-scale neural network (165,000 synapses), using phase-change memory as the synaptic weight element," http://ieeexplore.ieee.org/stamp/stamp.jsp?tp=&arnumber=7047135&tag=1, IEDM14-694, 4 pgs., 2014.

Datta et al., "Neuro Inspired Computing with Coupled Relaxation Oscillators," https://dl.acm.org/citation.cfm?doid=2593069.2596685, DAC '14 Proceedings of the 51st Annual Design Automation Conference, pp. 1-6, Jun. 1-5, 2014.

Meier et al., "Perceptual grouping through competition in coupled oscillator networks," ESANN 2013 proceedings, European Symposium on Artificial Neural Networks, Computational Intelligence and Machine Learning. Bruges (Belgium), Apr. 24-26, 2013, i6doc.com publ., ISBN 978-2-87419-081-0.

Simonov et al., "Pattern retrieval in a three-layer oscillatory network with a context dependent synaptic connectivity," Neural Networks, vol. 33, Sep. 2012, pp. 67-75, http://dl.acm.org/citation.cfm?id=2337133, Abstract Only.

Wikipedia, "Chemical synapse," https://en.wikipedia.org/wiki/Chemical_synapse, 9 pgs., printed Oct. 23, 2017.

* cited by examiner

MULTI-LAYER OSCILLATING NETWORK

BACKGROUND

The present disclosure relates generally to computing networks comprising a plurality of oscillators, and more particularly to multi-layer neural networks.

Arrays of coupled oscillators are believed to exhibit key attributes of biological neural networks for tasks such as pattern recognition. Currently, physical neural networks are implemented with adjustable resistance materials and used to emulate the function of a neural synapse. However, the scaling properties of known oscillator networks are currently limited.

SUMMARY

Embodiments of the present disclosure include a multi-layer computing network. The computing network may include a first layer with a first set of oscillators and a second layer with a second set of oscillators. The computing network may further include a plurality of adjustable coupling elements between the oscillators of the first set and a plurality of nonlinear elements. The plurality of nonlinear elements may be configured to couple output signals of the first layer to the second layer. The computing network may additionally include an encoding unit. The encoding unit may be configured to receive input signals, convert the input signals into phase-encoded output signals, and provide the phase-encoded output signals to the first layer.

Additional embodiments of the present disclosure include a method and computer program product for operating a multi-layer computing network. The method may include receiving, by an encoding unit, input signals. The input signals may be converted into phase-encoded output signals. The phase-encoded output signals may be provided to the first layer of a computing network. The first layer may include a first set of oscillators. The computing network may further include a plurality of adjustable coupling elements between oscillators in the first set of oscillators and a plurality of nonlinear elements. Phase encoded result signals may be provided by a second or subsequent layer, the second layer including a second set of oscillators. The method may further include decoding, by a decoding unit, the phase-encoded result signals.

The above summary is not intended to describe each illustrated embodiment or every implementation of the present disclosure. Embodiments of the present disclosure will be described in more detail below, by way of illustrative and non-limiting examples, with reference to the accompanying drawings.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
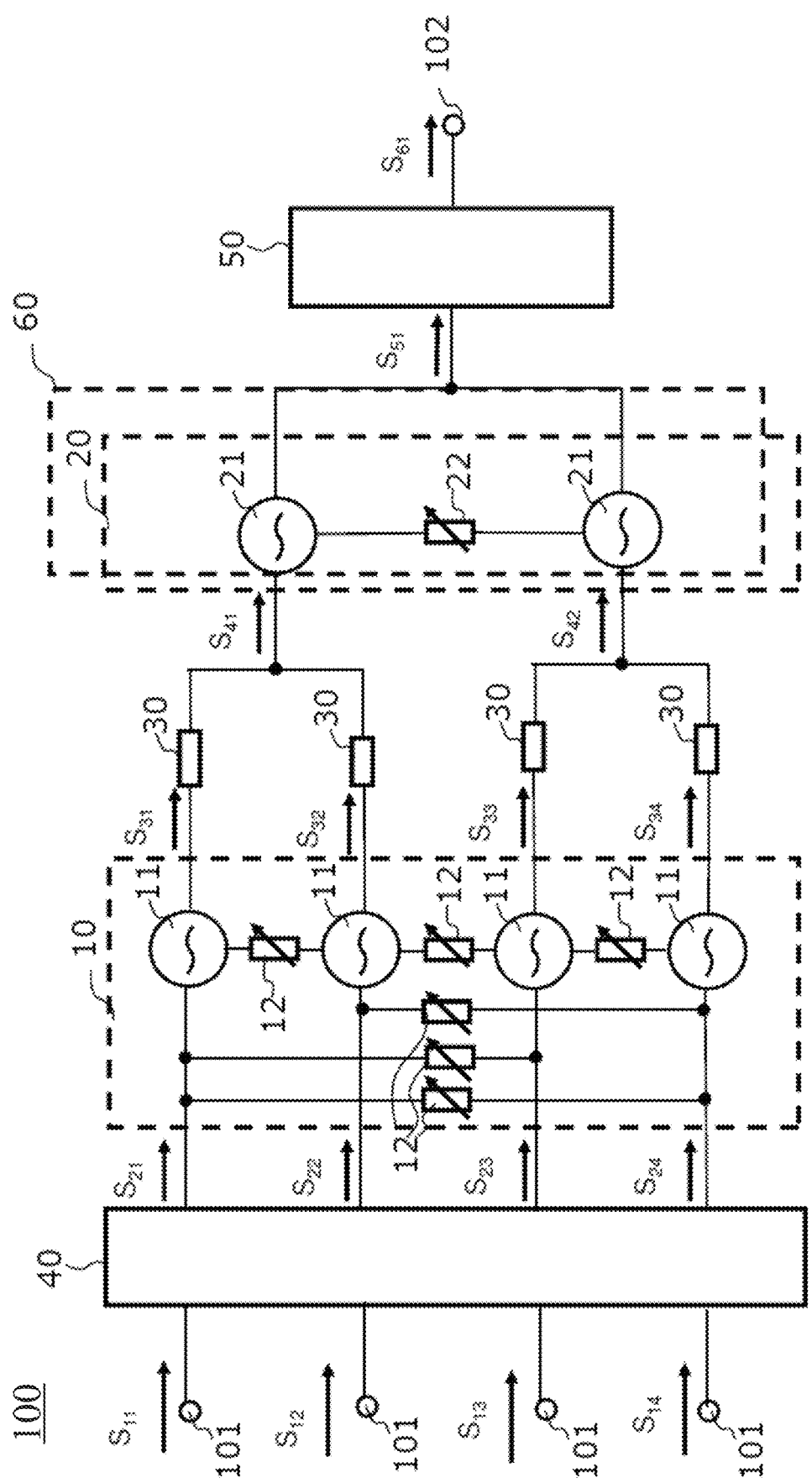
FIG. 1 shows a computing network, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to computing networks that have a plurality of oscillators. While the present disclosure is not necessarily limited to such applications, various aspects of the disclosure may be appreciated through a discussion of various examples using this context.

Aspects of the present disclosure may be embodied as a computing network comprising a first layer comprising a first set of oscillators and a second layer comprising a second set of oscillators. The computing network further comprises a plurality of adjustable coupling elements between the oscillators of the first set and a plurality of nonlinear elements. The nonlinear elements are configured to couple output signals of the first layer to the second layer. The computing network comprises an encoding unit configured to receive input signals, convert the input signals into phase-encoded output signals, and provide the phase-encoded output signals to the first layer.

Such an embodied computing network provides a network architecture, which enables scaling of oscillatory networks to multiple layers. Such an oscillatory network of multiple layers may provide enhanced computing power and flexibility. The nonlinear elements avoid a back action of the oscillatory signal from the second layer into the first layer.

According to a further embodiment, the encoding unit is configured to convert the input signals of the encoding unit into DC bias signals, wherein a time delay of the DC bias signals with respect to a bias reference signal represents the phase of the phase-encoded output signals of the encoding unit.

According to such an embodiment, the relative timing of the input signals of the first layer of coupled oscillators is used to encode the input signal of the computation. Encoding the input signal as a time delay facilitates an efficient and simple encoding circuit and reduces sensitivity to noise and drift.

According to a further embodiment, the computing network is configured to perform a training of the network by adjusting weights of the adjustable coupling elements.

Hence, according to such an embodiment, the adjustable coupling elements are configured as weighting elements of the computing network. The computing network can be trained by adapting the respective values (e.g., the resistance) of the coupling elements such that a given input situation, or more particularly a given set of input signals, will result in a predetermined phase of the oscillators. During operation (e.g., as an image recognition network), an unknown situation supplied to the input, or more particularly an unknown set of input signals, will result in an oscillation pattern that is closest to a previously trained pattern.

According to a further embodiment, the network is configured to combine a plurality of output signals of the first layer into a common input signal of the second layer. This may be used to reduce the number of oscillating signals in the second layer. This in return enhances the computing flexibility of the computing network.

According to a further embodiment, the network is configured to divide or, in other words, split one or more output signals of the first layer into a plurality of input signals of the second layer. This may be used to increase the number of oscillating signals in the second layer with respect to the first layer. This enhances the computing flexibility of the computing network.

According to a further embodiment, the network comprises a first number N of input nodes and a second number M of output nodes, wherein M<N. Such a reduction of the number of output nodes with respect to the number of input nodes provides the advantage that the result signals at the output nodes of the computing network may provide enhanced and/or more meaningful information. As an example, if the input of the computing network is an image, the reduced output could be just a number representing a predefined pattern (e.g., a training pattern), rather than an output image. According to embodiments, the number of output nodes can be much lower than the number of input nodes, for example by a factor of 2, a factor of 4, a factor of 10 or a higher factor.

According to a further embodiment, the network comprises a decoding unit. The decoding unit is configured to receive phase-encoded result signals from the second layer or a further layer and to decode the phase-encoded result signals.

According to a further embodiment, the computing network comprises one or more further layers comprising a further set of oscillators (e.g., each further layer may include a set of oscillators) and a plurality of nonlinear elements configured to couple output signals of the second layer to the further layers. Likewise, a plurality of nonlinear elements may exist between each layer and may be configured to couple output signals of one layer to the subsequent layer(s). This further enhances the computation possibilities.

According to an embodiment, the coupling elements may be implemented by programmable resistors or programmable capacitors.

According to a further embodiment, one or more adjustable coupling elements are provided between the oscillators of the second set. This provides additional tuning possibilities.

According to an embodiment, the nonlinear elements may be implemented by transistors or by diodes.

According to an embodiment, the second layer comprises one or more auxiliary voltage supplies configured to supply an auxiliary voltage to one or more oscillators of the second layer. Such additional voltage sources can be used to amplify the output signal of the second layer in order to refresh the corresponding signal levels.

According to a further embodiment, the oscillators are embodied as relaxation oscillators. The relaxation oscillators may comprise solid-state phase change materials having a first phase state and a second phase state. The first phase state may be a metallic state and the second phase state an insulating state. Such relaxation oscillators facilitate a dense integration of the computing network.

A second aspect of the present disclosure relates to a method for performing computing by means of a computing network. The method may be performed using the computing network described herein. The method comprises steps of receiving, by the encoding unit, input signals and converting the input signals of the encoding unit into phase-encoded output signals. The method comprises further steps of providing the phase-encoded output signals to the first layer, providing, by the second layer or a further layer, phase-encoded result signals, and decoding, by a decoding unit, the phase-encoded result signals.

In some embodiments, the method may comprise a step of converting, by the encoding unit, input signals of the encoding unit into DC bias signals. A time delay of the DC bias signals with respect to a bias reference signal represents the phase of the phase-encoded output signals of the encoding unit.

According to an embodiment, the method may comprise performing a training of the network by adjusting weights of the adjustable coupling elements.

Another aspect of the present disclosure provides a computer program product for operating a computing network. The computing network may be the same as described herein (e.g., according to the first aspect). Said computer program product comprises a computer readable storage medium having program instructions embodied therewith, the program instructions executable by the computing network to perform a method. The method may include receiving, by the encoding unit, input signals. The input signals may be converted into phase-encoded output signals. The phase-encoded output signals may be provided to the first layer. Phase encoded result signals may be provided to the second layer. The method may further include decoding, by a decoding unit, the phase-encoded result signals.

It is to be understood that the aforementioned advantages are example advantages and should not be construed as limiting. Embodiments of the present disclosure can contain all, some, or none of the aforementioned advantages while remaining within the spirit and scope of the present disclosure.

FIG. 1 shows a computing network 100, in accordance with embodiments of the present disclosure. The computing network 100 comprises a first layer 10 and a second layer 20. The first layer 10 comprises a first set of oscillators 11 and the second layer 20 comprises a second set of oscillators 21. The first layer 10 further comprises a plurality of adjustable coupling elements 12, which are arranged between the oscillators 11. More particularly, according to this example, the first layer 10 comprises four oscillators 11, and between each pair of the oscillators 11 there is arranged an adjustable coupling element 12.

The second layer 20 also comprises one or more adjustable coupling elements 22. More particularly, according to this example, the second layer 20 comprises two oscillators 21 and one adjustable coupling element 22 arranged between the oscillators 21.

The computing network 100 further comprises a plurality of nonlinear elements 30, which are arranged between the first layer 10 and the second layer 20. The plurality of nonlinear elements 30 is configured to couple output signals of the first layer 10 to the second layer 20.

More particularly, the computing network 100 comprises four nonlinear elements 30, which are each allocated to one of the four oscillators 11. The network 100 is configured to combine output signals $S_{31}$ and $S_{32}$ of the first layer 10 into a common input signal $S_{41}$ of the second layer 20. Furthermore, the network 100 is configured to combine output signals $S_{33}$ and $S_{34}$ of the first layer 10 into a common input signal $S_{42}$ of the second layer 20.

The nonlinear elements 30 avoid a back action of the signals from the second layer 20 into the first layer 10. More particularly, the nonlinear elements 30 prevent the coupling elements 22 of the second layer 20 from affecting the coupling elements 12 of the first layer 10 and vice versa. According to embodiments, the nonlinear elements 30 may be implemented by diodes or transistors, for example.

The adjustable coupling elements 12, 22 may be implemented, for example, as programmable resistors or as programmable capacitors. The respective implementation may use transistors or resistive memory devices such as phase change memory devices.

The computing system 100 further comprises an encoding unit 40. The encoding unit 40 is configured to receive four input signals $S_{11}$, $S_{12}$, $S_{13}$, and $S_{14}$ and convert these input signals into phase-encoded output signals $S_{11}$, $S_{22}$, $S_{23}$, and $S_{24}$, respectively. The phase-encoded output signals $S_{21}$, $S_{22}$, $S_{23}$, and $S_{24}$ are provided as input signals to the first layer 10 and trigger oscillations of the oscillators 11, 21.

The network 100 comprises a first number N of input nodes 101, wherein N=4 in this example, and a second number M of output nodes 102, wherein M=1 in this example.

The network 100 further comprises a decoding unit 50. The decoding unit 50 is configured to receive a phase-encoded result signal $S_{51}$ from the second layer 20. The decoding unit 50 decodes the phase-encoded result signal $S_{51}$ and provides an output signal $S_{61}$ at the output node 102.

Hence, according to the embodiment as illustrated in FIG. 1, the number M of output nodes 102 is lower than the number N of input nodes 101. Such a reduction enhances the computing flexibility of the computing network 100. As an example, if the input of the computing network 100 is an image, the output could be an identifier such as a number rather than another image.

Hence, the computing network 100 incorporates a multiprocessing layer network that enables scaling of oscillatory networks to multiple layers. Such an oscillatory network of multiple layers may provide much more computing power and flexibility than single layer oscillatory networks.

According to further embodiments, the computing network 100 may comprise further layers 60 comprising a further set of oscillators and corresponding further nonlinear elements, which is indicated in FIG. 1 by dotted lines.

It is to be understood that the computing network 100 shown in FIG. 1 is an example computing network. The number and arrangement of components (e.g., oscillators, layers, nonlinear elements, coupling elements, etc.) shown in FIG. 1 is not to be construed as limiting. Instead, any number and arrangement of components otherwise consistent with this disclosure is contemplated.

Figure 2B:
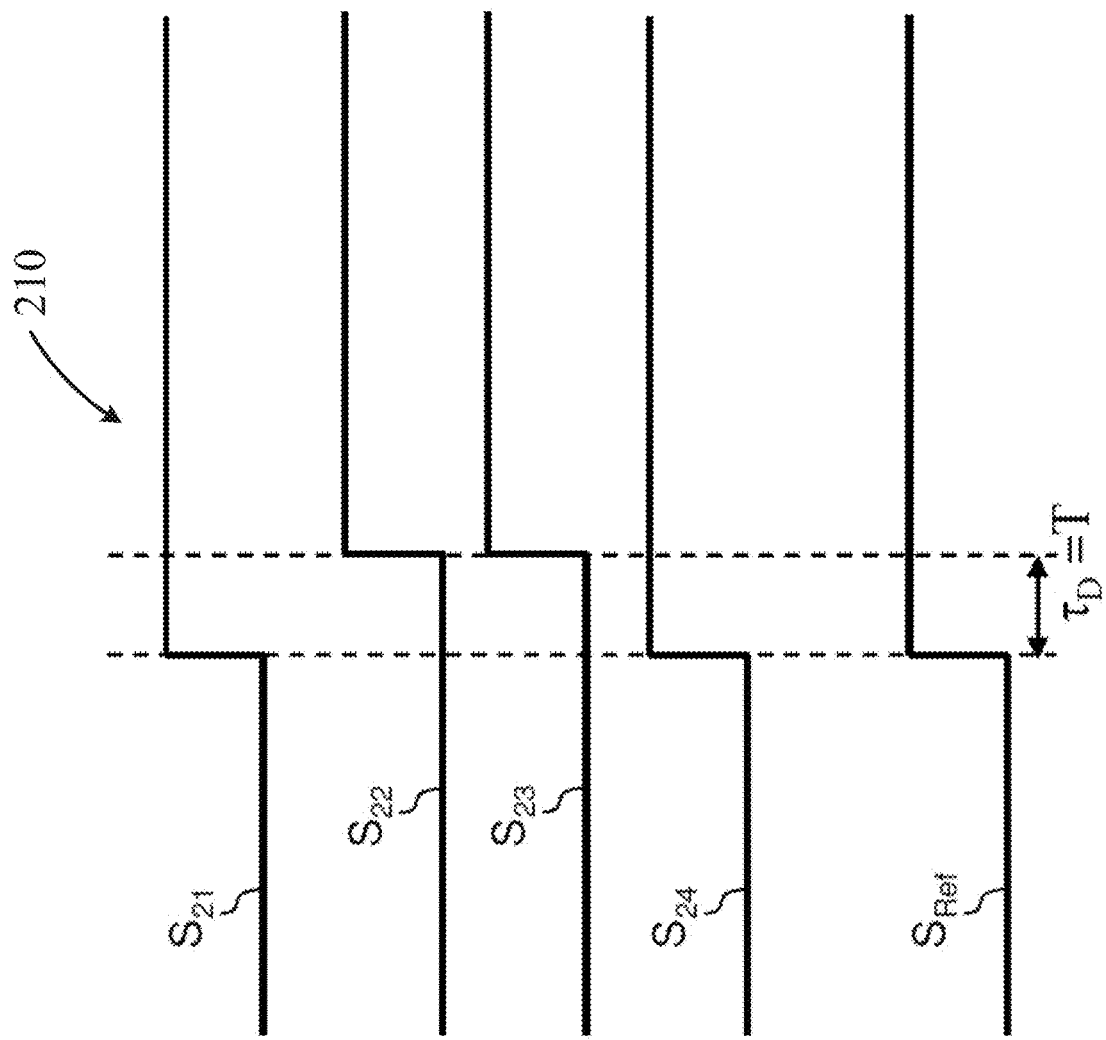
FIG. 2B shows phase-encoded output signals of an encoding unit, in accordance with embodiments of the present disclosure.
Figure 2A:
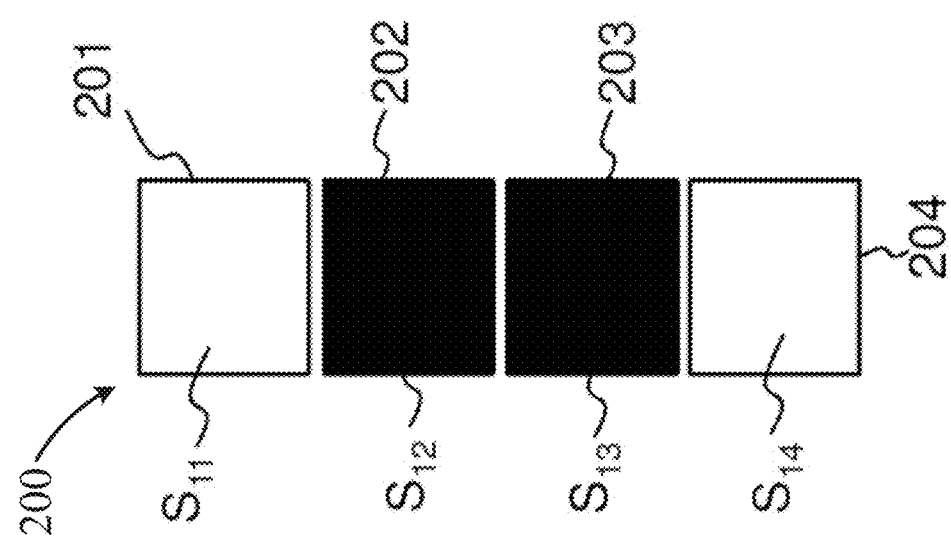
FIG. 2A illustrates an example of an input signal of the computing network of FIG. 1, in accordance with embodiments of the present disclosure.

FIG. 2A illustrates an example of an input signal 200 of the computing network 100 of FIG. 1, in accordance with embodiments of the present disclosure. The input signal 200 represents four pixels 201, 202, 203 and 204 of an electronic picture. The pixels 201 and 204 are white pixels, while the pixels 202 and 203 are black pixels. Accordingly, the input signal 200 may be represented by four DC bias signals, wherein the black pixels correspond to a first DC bias level (e.g., a high level), and the white pixels correspond to a second DC bias level (e.g., a low(er) level).

Referring to FIG. 1, the respective voltage level of the pixels 201, 202, 203 and 204 could be supplied as DC bias input signals $S_{11}$, $S_{12}$, $S_{13}$ and $S_{14}$, respectively, to the input ports 101. The encoding unit 40 performs a phase-encoding of these input signals $S_{11}$, $S_{12}$, $S_{13}$ and $S_{14}$ and converts the input signals $S_{11}$, $S_{12}$, $S_{13}$ and $S_{14}$ into phase-encoded output signals $S_{21}$, $S_{22}$, $S_{23}$ and $S_{24}$ respectively, as illustrated in the graph 210 of FIG. 2B.

More particularly, the DC input signals $S_{11}$, $S_{12}$, $S_{13}$, and $S_{14}$ are converted into DC output signals $S_{11}$, $S_{22}$, $S_{23}$, and $S_{24}$, respectively, with a predefined time delay with respect to a bias reference signal $S_{ref}$. A time delay $\tau_D$ with respect to the bias reference signal $S_{ref}$ represents the phase of the phase-encoded output signals $S_{21}$, $S_{22}$, $S_{23}$, and $S_{24}$. In this example, the output signals $S_{21}$ and $S_{24}$ are synchronous with the reference signal $S_{ref}$. Hence the white pixels 201 and 204 are encoded with a time delay $\tau_D=0$. This corresponds to a phase or phase shift $\varphi=0$. Furthermore, the black pixels 202 and 203 are encoded with a time delay $\tau_D=T$. The DC output signals $S_{21}$, $S_{22}$, $S_{23}$, and $S_{24}$ trigger oscillations of the oscillators 11, 21, wherein a different time delay $\tau_D$ results in different phases of the triggered oscillation signals.

The phase $\varphi$ represents the phase shift or phase relation with respect to the reference signal $S_{Ref}$. Accordingly, the oscillating signals $S_{31}$ and $S_{34}$ have a phase $\varphi=0$ (in the steady state) and the oscillating signals $S_{32}$, $S_{33}$ of the oscillators 11 of the first layer 10 have a different phase $\varphi=x°$. The time delay $\tau_D=T$ of the signals $S_{22}$, $S_{23}$ is preferably chosen such that it corresponds to a phase $\varphi=180°$. In other words, the time delay $\tau_D=T$ is preferably chosen such that it corresponds to a time that is close to one half period of the oscillations of the oscillating signals $S_{31}$, $S_{32}$, $S_{33}$ and $S_{34}$ of the oscillators 11 in the steady state. While the time delay $\tau_D=T$ of the signals $S_{22}$, $S_{23}$ is preferably chosen such that it corresponds to a phase $\varphi=$approximately 180° in some embodiments, the time delay and/or phase may not corresponds to approximately 180° in other embodiments.

Accordingly, in some embodiments, the relative timing of the input signals $S_{21}$, $S_{22}$, $S_{23}$ and $S_{24}$ of the first layer 10 is used to encode the input signals of the computation (i.e., the input signals $S_{11}$, $S_{12}$, $S_{13}$ and $S_{14}$ of the pixels 201, 202, 203 and 204, respectively).

While in this embodiment the time delay $\tau_D$ has only two different values, namely $\tau_D=0$ and $\tau_D=T$, corresponding to a digital input (black and white pixels only), other embodiments may provide continuous time delay values $\tau_D$ on a sliding scale corresponding to phases $\varphi$ between 0° and 180°. As an example, a continuous time delay $\tau_D$ could represent in a continuous manner the grey scale of an image pixel. The darker the pixel, the longer the corresponding time delay value $\tau_D$ and the larger the phase $\varphi$.

Encoding the input signals to the first layer 10 as a time delay facilitates a reliable, simple, and efficient implementation of the encoding unit 40. In addition, this reduces sensitivity to noise and drift.

The computing network 100 as presented above may be used to perform Boolean digital phase logic encoding the logic level as phase (0,180) relative to a reference input signal/reference input voltage.

The computing network 100 (e.g., a processor or other computing device within the computing network 100) may be configured to perform a training of the network 100 by adjusting weights of the adjustable coupling elements 12, 22. More particularly, the computing network 100 can be trained by adapting, for example, the resistance values of the adjustable coupling elements 12, 22 such that a given set of input signals $S_{11}$, $S_{12}$, $S_{13}$, and $S_{14}$ will result in a predetermined phase difference between the oscillators 21 of the second layer 22. The respective phase difference can then be decoded by the decoding unit 50.

Accordingly, the decoding unit 50 may operate as phase discriminator or phase detector. If during operation (e.g. as image recognizing network), an unknown set of input signals $S_{11}$, $S_{12}$, $S_{13}$ and $S_{14}$ is supplied to the computing network 100, this will result in an oscillation pattern of the oscillators 11, 21 that is closest to a previously trained pattern, and finally in a corresponding phase difference between the oscillators 21 of the second layer that is closest to the phase difference of a previously trained pattern.

Figure 3:
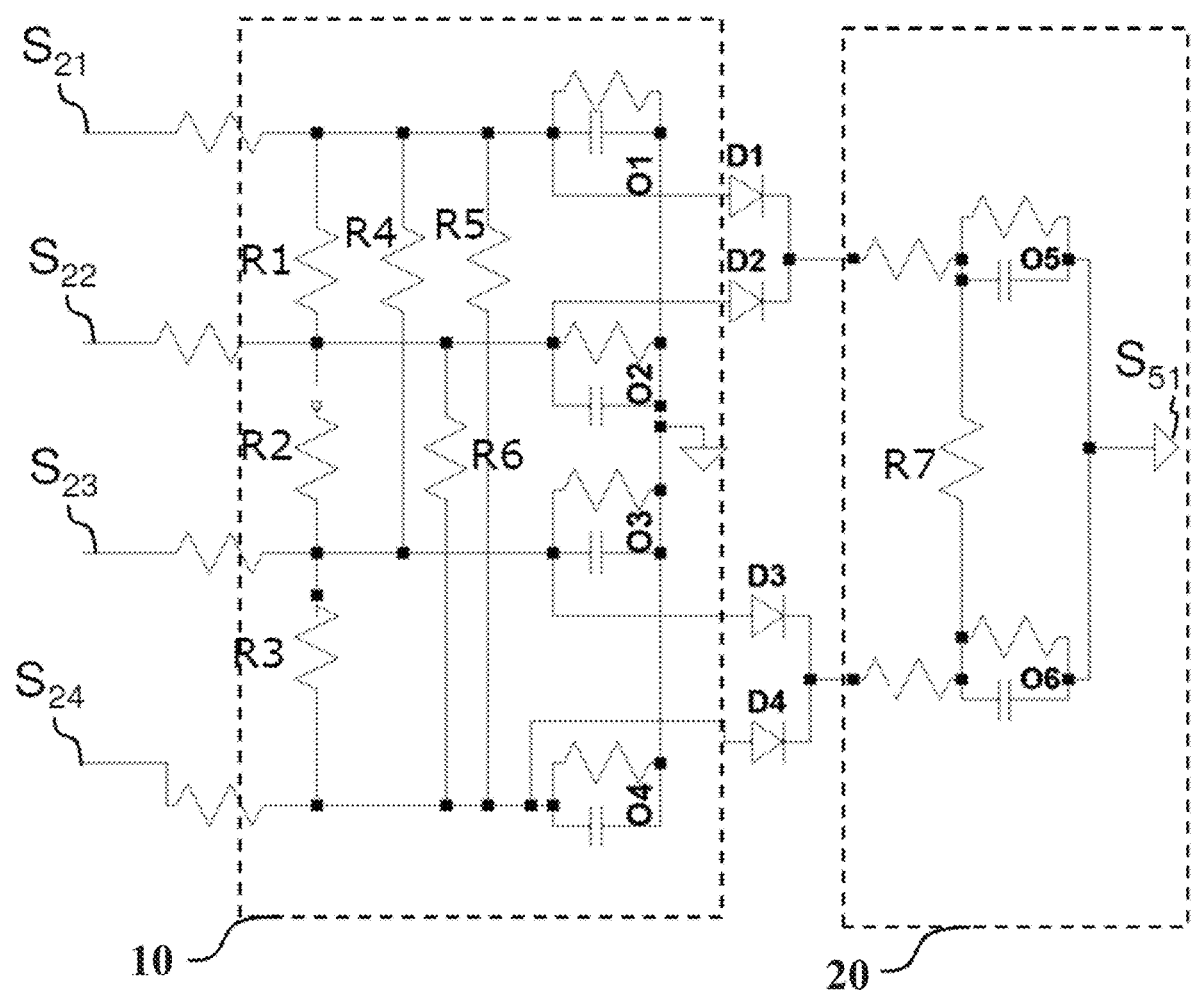
FIG. 3 shows a computing network according to another embodiment of the present disclosure.

FIG. 3 shows a computing network 300 according to an embodiment of the present disclosure. The computing network 300 represents a more detailed embodiment of the computing network 100 as illustrated in FIG. 1, with the first and second layers 10 and 20 illustrated. More particularly, the adjustable coupling elements 12 are implemented as programmable resistors R1, R2, R3, R4, R5, and R6. The oscillators 11 of the first layer 10 are implemented as RC-oscillators O1, O2, O3, and O4. The oscillators 21 of the second layer 20 are implemented as RC-oscillators O5 and O6. The nonlinear elements 30 are implemented as diodes D1, D2, D3, and D4. Furthermore, the adjustable coupling element 22 of the second layer 20 is implemented as programmable resistor R7. The encoding unit 40 and the decoding unit 50 are omitted in the illustration of FIG. 3.

Figure 4:
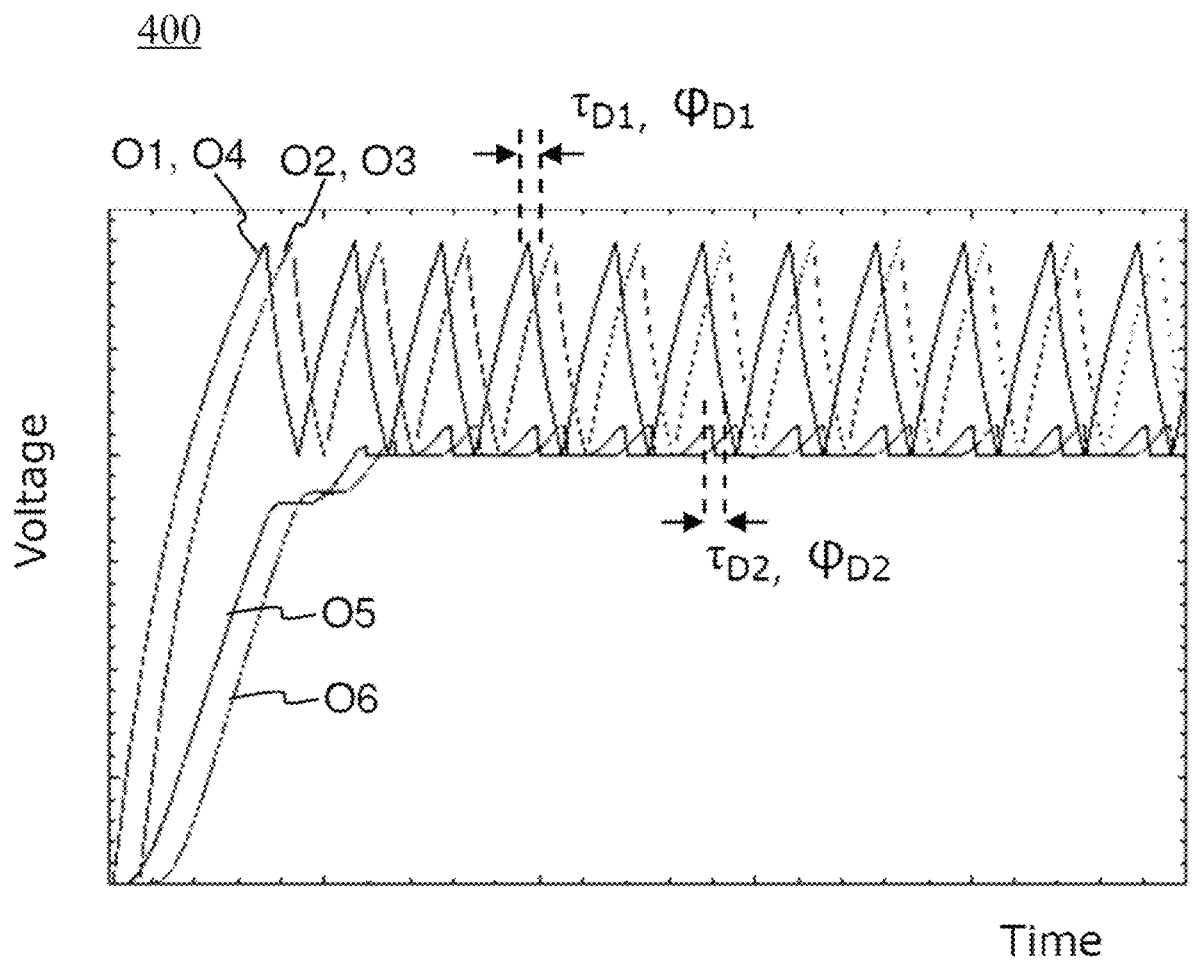
FIG. 4 shows exemplary simulations of signal diagrams of oscillating signals of the oscillators of the computing network of FIG. 3, in accordance with embodiments of the present disclosure.

FIG. 4 shows exemplary simulations 400 of signal diagrams of oscillating signals of the oscillators $O_1$, $O_2$, $O_3$, $O_4$, $O_5$ and $O_6$ of FIG. 3. For the simulation, it was assumed that the oscillating network 300 is triggered by the set of input signals 200 as illustrated with reference to FIGS. 2A and 2B.

As can be seen, the oscillating signals of the oscillators $O_1$ and $O_4$ are phase-synchronous and the oscillating signals of the oscillators $O_2$ and $O_3$ are phase-synchronous as well. Between the oscillating signals of the oscillators $O_1$, $O_4$ and the oscillating signals of the oscillators $O_2$, $O_3$ there is a time delay $\tau_{D1}$ and a corresponding phase difference $\varphi_{D1}$.

Furthermore, between the oscillating signals of the oscillators $O_5$ and $O_6$ there is a time delay $\tau_{D2}$. The oscillating signals of the oscillators $O_5$ and $O_6$ form phase-encoded results signals corresponding to the signal(s) $S_{51}$, which are supplied to the decoding unit 50. The decoding unit 50 decodes the oscillating signals of the oscillators $O_5$ and $O_6$. More particularly, the decoding unit 50 determines the time delay $\tau_{D2}$ between the oscillating signals of the oscillators $O_5$ and $O_6$ and the corresponding phase difference $\varphi_{D2}$. The phase difference $\varphi_{D2}$ represents a result of the computation of the computing network 300.

Figure 5:
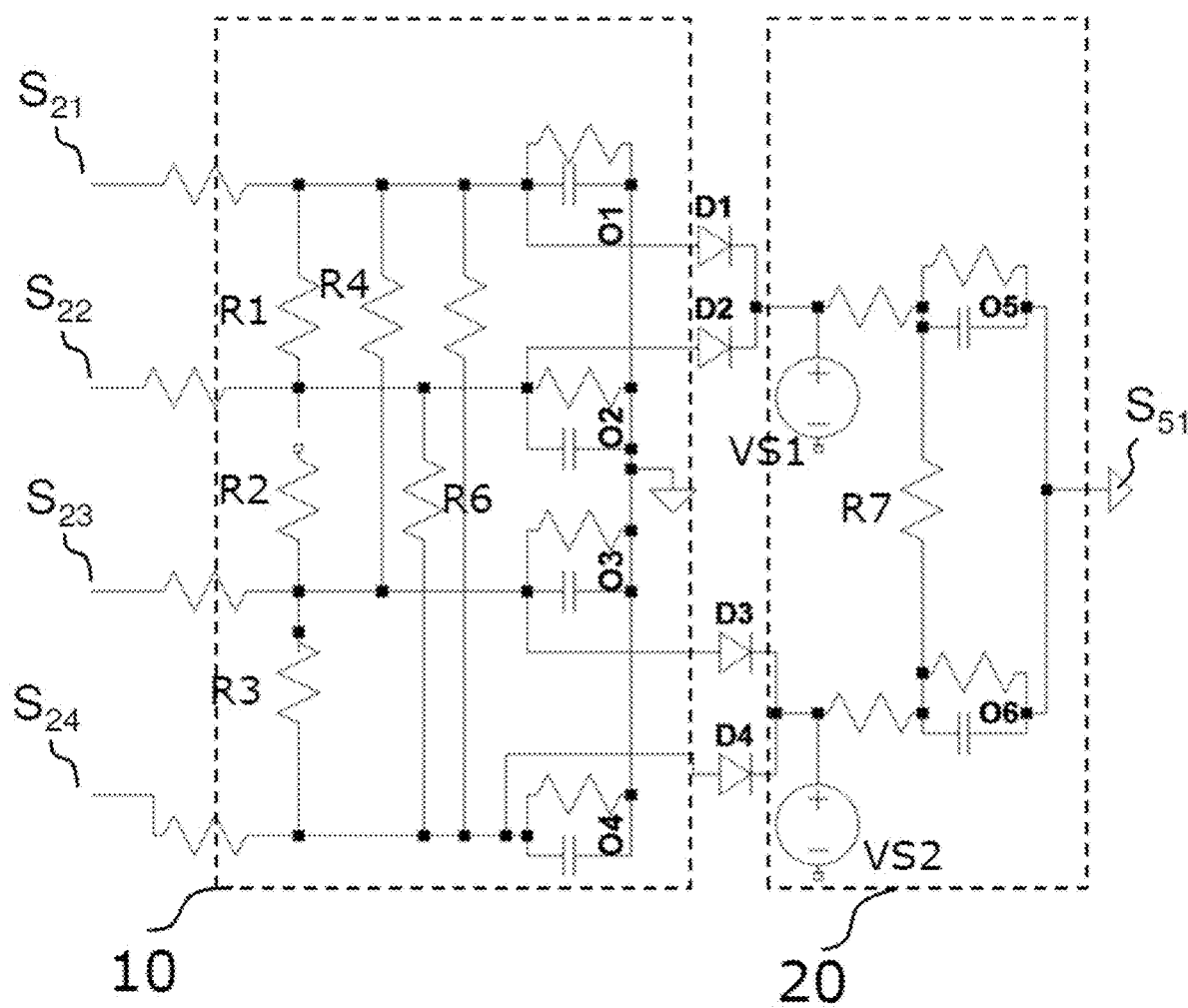
FIG. 5 shows a computing network comprising auxiliary voltage supplies according to another embodiment of the present disclosure.

FIG. 5 shows a computing network 500 according to another embodiment of the present disclosure. The computing network 500 corresponds largely to the computing network 300 as illustrated with reference to FIG. 3.

In addition, the second layer 20 of the computing network 500 comprises auxiliary voltage supplies VS1 and VS2. The auxiliary voltage supply VS1 is configured to supply an auxiliary voltage to the oscillator O5 and the auxiliary voltage supply VS2 is configured to supply an auxiliary voltage to the oscillator O6. The additional DC voltages supplied by the auxiliary voltage supplies VS1 and VS2 amplify the output signal of the second layer 20 to the original amplitude. In other words, it refreshes the signal levels of the oscillators of the second layer 20 to compensate for losses in the oscillation amplitude. Such losses can be seen in FIG. 4, in which the signal amplitude of the oscillators O5, O6 is smaller than the signal amplitude of the oscillators O1, O2, O3 and O4.

Figure 6:
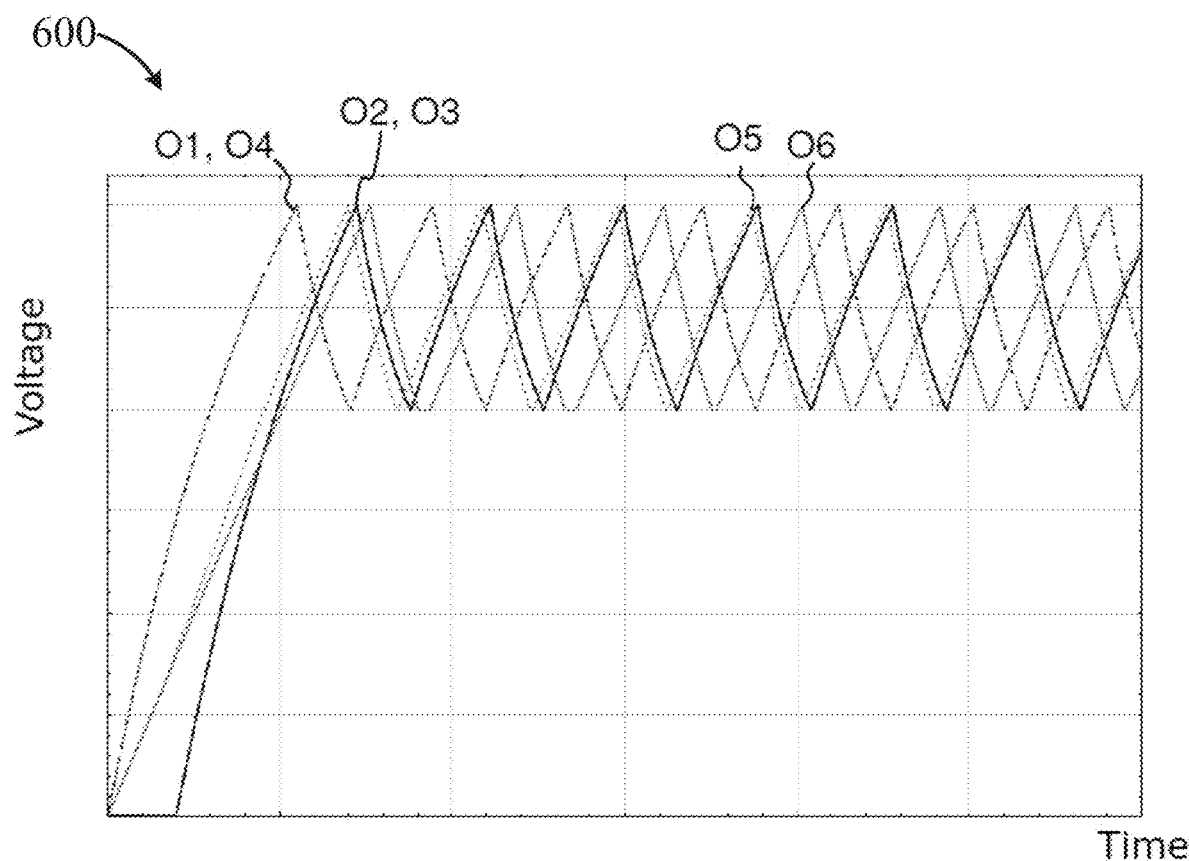
FIG. 6 shows exemplary simulations of signal diagrams of oscillating signals of the oscillators of the computing network of FIG. 5, in accordance with embodiments of the present disclosure.

FIG. 6 shows exemplary simulations 600 of signal diagrams of oscillating signals of the oscillators O1, O2, O3, O4, O5 and O6 of FIG. 5, in accordance with embodiments of the present disclosure. For the simulation, it was assumed that the oscillating network 500 is triggered by the set of input signals 200 as illustrated with reference to FIGS. 2A and 2B. As can be seen, the signal amplitude of the oscillators O5, O6 is at the same level as the signal amplitude of the oscillators O1, O2, O3, and O4 due to the auxiliary voltage supplies VS1 and VS2.

Figure 7:
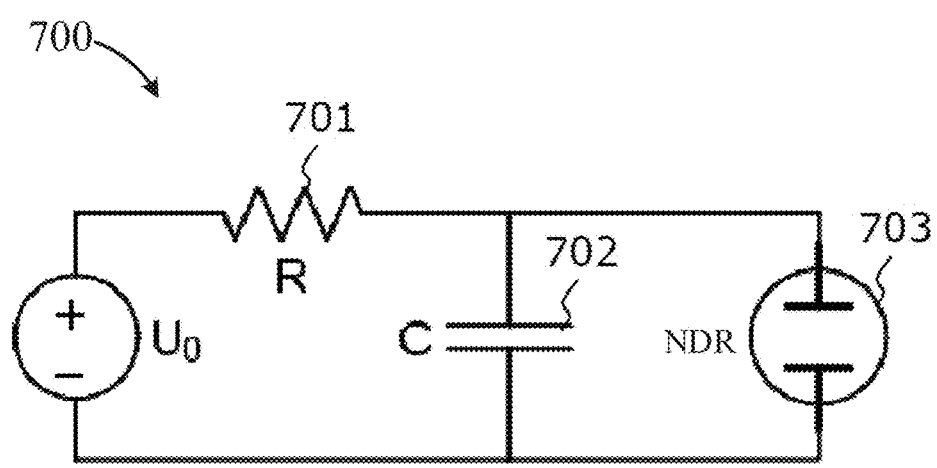
FIG. 7 shows a circuit diagram of an exemplary embodiment of an oscillator, in accordance with embodiments of the present disclosure.

FIG. 7 shows a circuit diagram of an exemplary embodiment of an oscillator 700, in accordance with embodiments of the present disclosure. The oscillator 700 may be used for the oscillators 11, 21 of the first and the second layers of FIG. 1, respectively. The oscillator 700 is embodied as relaxation oscillator. The oscillator 700 comprises a resistor 701, a capacitor 702, and a negative differential resistance (NDR) element 703. The oscillator 700 is driven by a supply voltage $U_0$.

The negative differential resistance (NDR) element 703 of the relaxation oscillator 700 may be implemented by solid-state phase change materials having a first phase state and a second phase state. The first phase state may be in particular a metallic state and the second phase state an insulating state. Suitable materials for the NDR element 703 may encompass VO2, V4O7, V6O11, V2O3, V6O13, V5O9, VO, V8O15, NbO2, Ti2O3, LaCoO3, Ti3O5, SmNiO3, NdNiO3, PrNiO3, and Fe3O4.

Figure 8:
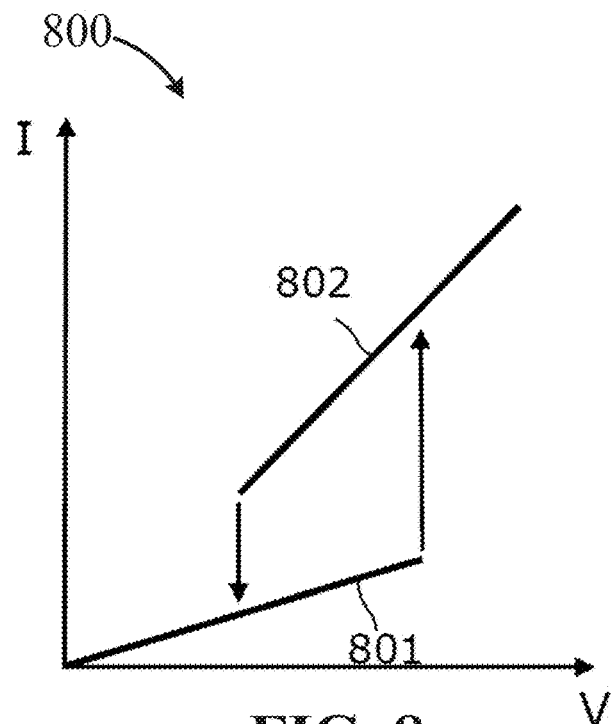
FIG. 8 illustrates an exemplary current-voltage diagram of a metal-insulator phase change material, in accordance with embodiments of the present disclosure.

FIG. 8 illustrates an exemplary current-voltage diagram 800 of a metal-insulator phase change material. The current-voltage diagram 800 is S-shaped. More particularly, it has an insulating part 801 in which the phase change material is in an insulating state. Furthermore, it has a metallic part 802 in which the phase change material is in a metallic state.

During operation in an oscillator, the phase change material switches between the insulating state and the metallic state. More particularly, the NDR element 703 exhibits a metal-insulator transition upon self-heating and the voltage drop over the NDR element 703 oscillates accordingly.

Figure 9A:
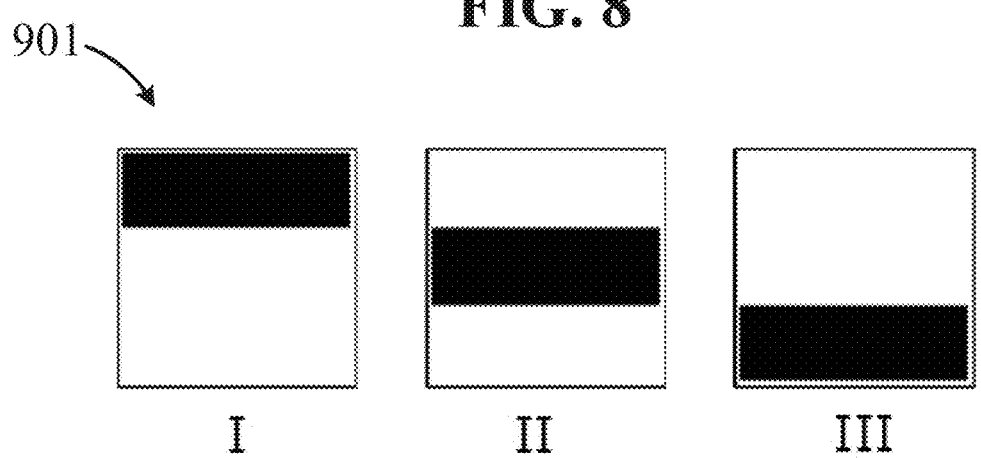
FIGS. 9A to 9C illustrate an example of a computing network configured for image recognition, in accordance with embodiments of the present disclosure.
Figure 9B:
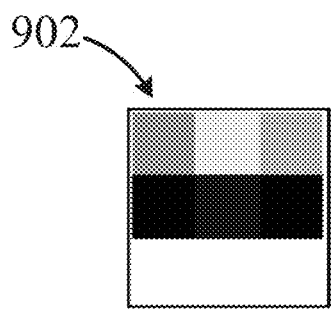
Figure 9C:
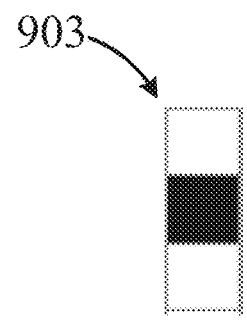

FIGS. 9A to 9C illustrate an example how a computing network may be used for image recognition, in accordance with embodiments of the present disclosure.

FIG. 9A shows three images that represent a training pattern 901 for the computing network. The computing network is assumed to have nine input nodes/pixels and three output nodes/pixels. The computing network is trained with these three images such that the phase shift of the output indicates the number of the training pattern, in this example numbered with I, II, and III.

FIG. 9B shows a search pattern 902 that shall be analyzed by the computing network. When the search pattern of FIG.

9B is applied to the input of the computing network, an output pattern 903 as illustrated in FIG. 9C is provided by the computing network. The output pattern 903 has a reduced complexity with respect to the search pattern/input pattern 902 and indicates the index number of the best matching training pattern. In this example, the output pattern 903 could be interpreted such that the search pattern 902 resembles the training pattern no. II of the training patterns 901.

Figure 10:
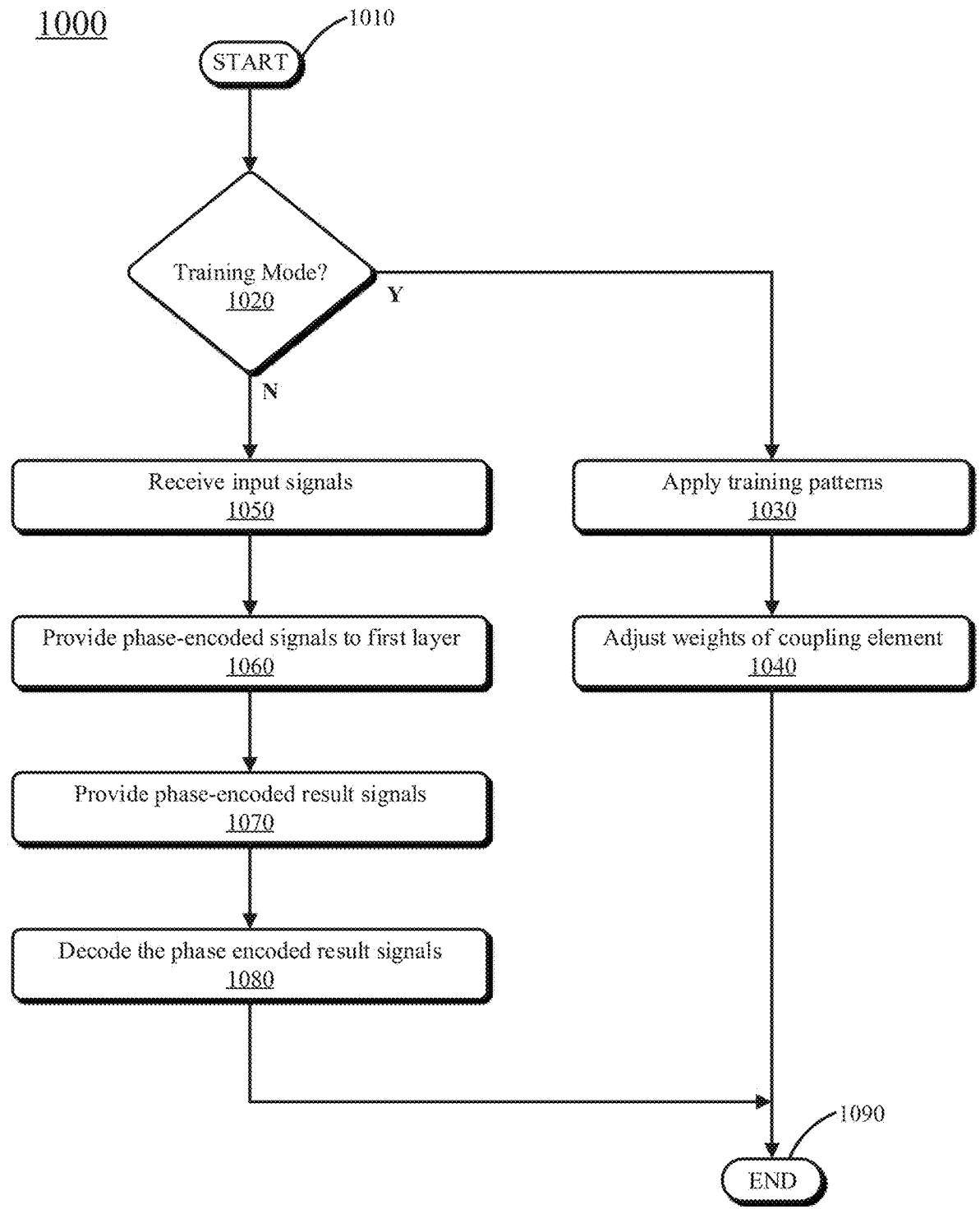
FIG. 10 shows a flowchart of an example method for performing computing by means of a computing network, in accordance with embodiments of the present disclosure.

FIG. 10 illustrates a flowchart of an example method 1000 for performing computing by means of a computing network, in accordance with embodiments of the present disclosure. While the method 1000 may be performed using various computing networks, as discussed herein, the method 1000 is described as performed by the computing network 100 of FIG. 1 for illustrative purposes. At a step 1010, the method 1000 starts.

At a step 1020, the network 100 checks whether it shall operate in a training mode or a compute mode. In some embodiments, a user may select which mode the network is in. In some embodiments, the network 100 may receive data to be analyzed (e.g., image data), and the network 100 may determine, from the received data (e.g., from metadata with the image data) whether the network should process the received data in a training mode or a compute mode.

If the network 100 determines that it is to operate in a training mode at step 1020, one or more training patterns are applied to the network 100 at step 1030. The training patterns may be one or more signals, images, or other inputs used to train the network 100. For example, if the network 100 is being trained to perform image recognition, the training patterns may include images, as shown in FIG. 9A.

Then, at a step 1040, the weights of the adjustable coupling elements 12, 22 are adjusted. As described herein, the weights of the adjustable coupling elements may be adjusted based on the training patterns. The weights of the adjustable coupling elements may be adjusted periodically using new training patterns. After the weights are adjusted at step 1040, the method 1000 may end.

If the network 100 determines that it is to operate in a compute mode at step 1020, the encoding unit 40 receives, at a step 1050, input signals for the computation. The type of input signals received may depend on the type of processing that the network 100 is configured to perform. For example, if the network 100 is configured to perform image processing, the input signals may correspond to pixel color, as described in reference to FIGS. 2A and 2B.

At a step 1060, the encoding unit 40 converts the input signals into phase-encoded output signals and provides the phase-encoded output signals to the first layer 10. As described herein, the input signals may be converted into DC output signals (e.g., the phase-encoded output signals) with a predefined time delay with respect to a reference signal. The time delay may represent the phase of the phase-encoded output signals. The number of phases may depend on the number of variations in input signals. For example, if the input signals are binary (e.g., have one of two values), there may be two phases (e.g., phase $\varphi=0$ or 180). If, however, there are many different input signals (e.g., each input signal represents a greyscale color for a particular pixel in an image), the output signals may have a multitude of time delays and corresponding phases (e.g., there may be continuous time delay values $\tau_D$ on a sliding scale corresponding to phases $\varphi$ between 0° and 180°).

At a step 1070, the second layer 20 or a further layer provides phase-encoded result signals to the decoding unit 50. At a step 1080, the decoding unit 50 decodes the phase-encoded result signals. After decoding the phase-encoded results signals, an output signal may be provided to an output node (e.g., output node 102 in FIG. 1). At a step 1090, the method 1000 ends or is started again with step 1010.

Embodiments of the present disclosure include a method and computer program product for operating a multi-layer computing network. The computing network may include a first layer having a first set of oscillators, a second layer having a second set of oscillators, a plurality of adjustable coupling elements between the oscillators of the first set, a plurality of nonlinear elements, and an encoding unit. The method may include receiving, by the encoding unit, input signals. The input signals may be converted into phase-encoded output signals. The phase-encoded output signals may be provided to the first layer. Phase encoded result signals may be provided to the second layer. The method may further include decoding, by a decoding unit, the phase-encoded result signals.

The present invention may be a system, a method, and/or a computer program product. The computer program product may include a computer readable storage medium (or media) having computer readable program instructions thereon for causing a processor to carry out aspects of the present invention.

Aspects of the present disclosure may be embodied as a computer program product for operating a computing network (e.g., the computing network 100 as described above).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing network comprising:
a first layer comprising a first set of oscillators;
a second layer comprising a second set of oscillators;
a plurality of adjustable coupling elements between the oscillators of the first set; and
a plurality of nonlinear elements, the plurality of nonlinear elements being configured to couple output signals of the first layer to the second layer; and
an encoding unit configured to:
  receive input signals;
  convert the input signals into phase-encoded output signals by converting the input signals of the encoding unit into DC bias signals, wherein a time delay of the DC bias signals with respect to a bias reference signal represents the phase of the phase-encoded output signals;
  provide the phase-encoded output signals to the first layer.

2. The computing network of claim 1, wherein the computing network is configured to perform a training of the network by adjusting weights of the adjustable coupling elements.

3. The computing network of claim 1, wherein the network is configured to combine a plurality of output signals of the first layer into a common input signal of the second layer.

4. The computing network of claim 1, wherein the network is configured to divide one or more output signals of the first layer into a plurality of input signals of the second layer.

5. The computing network of claim 1, wherein the network comprises a first number N of input nodes and a second number M of one or more output nodes, wherein M<N.

6. The computing network of claim 1, further comprising a decoding unit, the decoding unit being configured to:
receive phase-encoded result signals from the second layer or a further layer;
decode the phase-encoded result-signals.

7. The computing network of claim 1, further comprising:
one or more further layers comprising a further set of oscillators;
a plurality of nonlinear elements being configured to couple output signals of the second layer to the further layers.

8. The computing network of claim 1, comprising one or more adjustable coupling elements between the oscillators of the second set.

9. The computing network of claim 1, wherein the coupling elements are selected from the group consisting of programmable resistors and programmable capacitors.

10. The computing network of claim 1, wherein the nonlinear elements are selected from the group consisting of transistors and diodes.

11. The computing network of claim 1, wherein the second layer comprises one or more auxiliary voltage supplies configured to supply an auxiliary voltage to one or more oscillators of the second layer.

12. The computing network of claim 1, wherein the oscillators are embodied as relaxation oscillators.

13. The computing network of claim 12, wherein the relaxation oscillators comprise solid-state phase change materials having a first phase state and a second phase state.

14. The computing network of claim 13, wherein the first phase state is a metallic state and the second phase state is an insulating state.

15. The computing network of claim 13, wherein the solid state phase change material is selected from the group consisting of $VO_2$, $V_4O_7$, $V_6O_{11}$, $V_2O_3$, $V_6O_{13}$, $V_5O_9$, $VO$, $V_8O_{15}$, $NbO_2$, $Ti_2O_3$, $LaCoO_3$, $Ti_3O_5$, $SmNiO_3$, $NdNiO_3$, $PrNiO_3$, and $Fe_3O_4$.

16. A method for performing computing by means of a computing network, the method comprising:
receiving, by an encoding unit, input signals;
converting the input signals of the encoding unit into phase-encoded DC bias signals, wherein a time delay of the DC bias signals with respect to a bias reference signal represents the phase of the phase-encoded DC bias signals;
providing the phase-encoded DC bias signals to a first layer of a computing network, the first layer including a first set of oscillators, the computing network further including a plurality of adjustable coupling elements between the oscillators of the first set and a plurality of nonlinear elements;
providing, by a second layer or a further layer of the computing network, phase-encoded result signals, the second layer including a second set of oscillators; and
decoding, by a decoding unit, the phase-encoded result signals.

17. The method of claim 16, the method further comprising:
performing a training of the computing network by adjusting weights of the adjustable coupling elements.

18. A computer program product for operating a computing network, the computer program product comprising a computer readable storage medium having program instructions embodied therewith, the program instructions executable by one or more processing circuits to perform a method comprising:
receiving, by an encoding unit, input signals;
converting the input signals of the encoding unit into phase-encoded DC bias signals, wherein a time delay of the DC bias signals with respect to a bias reference signal represents the phase of the phase-encoded DC bias signals;
providing the phase-encoded DC bias signals to a first layer of a computing network, the first layer including a first set of oscillators, the computing network further including a plurality of adjustable coupling elements between the oscillators of the first set and a plurality of nonlinear elements;
providing, by a second layer or a further layer of the computing network, phase-encoded result signals, the second layer including a second set of oscillators; and
decoding, by a decoding unit, the phase-encoded result signals.

* * * * *